United States Patent
Mitomo et al.

(10) Patent No.: US 11,022,518 B2
(45) Date of Patent: Jun. 1, 2021

(54) WALL SURFACE PRESSURE MEASUREMENT STRUCTURE AND WIND-TUNNEL TEST APPARATUS

(71) Applicants: SUBARU CORPORATION, Tokyo (JP); Japan Aerospace Exploration Agency, Tokyo (JP)

(72) Inventors: Toshiteru Mitomo, Tokyo (JP); Ryota Takaya, Tokyo (JP); Yoshikazu Makino, Tokyo (JP)

(73) Assignees: SUBARU CORPORATION, Tokyo (JP); Japan Aerospace Exploration Agency, Tokyo (JP)

( * ) Notice: Subject to any disclaimer, the term of this patent is extended or adjusted under 35 U.S.C. 154(b) by 271 days.

(21) Appl. No.: 16/172,706

(22) Filed: Oct. 26, 2018

(65) Prior Publication Data

US 2019/0128773 A1 May 2, 2019

(30) Foreign Application Priority Data

Oct. 27, 2017 (JP) .................................. 2017-207779

(51) Int. Cl.
*G01M 9/04* (2006.01)
*G01M 9/06* (2006.01)
*G01M 9/08* (2006.01)
*G01L 19/00* (2006.01)

(52) U.S. Cl.
CPC .............. *G01M 9/065* (2013.01); *G01M 9/04* (2013.01); *G01M 9/08* (2013.01); *G01L 19/0007* (2013.01)

(58) Field of Classification Search
CPC . G01N 9/065; G01N 9/04; G01N 9/08; G01L 19/0007
See application file for complete search history.

(56) References Cited

U.S. PATENT DOCUMENTS

| | | | |
|---|---|---|---|
| 6,928,884 B1 * | 8/2005 | Pearson ................... | G01F 1/46 73/861.42 |
| 2012/0103101 A1 * | 5/2012 | Jo ........................ | G01L 19/0007 73/708 |
| 2017/0292864 A1 * | 10/2017 | Zhang ................... | G01F 1/6845 |

FOREIGN PATENT DOCUMENTS

| | | | |
|---|---|---|---|
| CN | 2651716 Y | * | 10/2004 |
| JP | H10-267786 A | | 10/1998 |

* cited by examiner

*Primary Examiner* — Daniel S Larkin
(74) *Attorney, Agent, or Firm* — Troutman Pepper Hamilton Sanders LLP

(57) ABSTRACT

A wall surface pressure measurement structure measures a wall surface pressure in a duct. Measurement holes are formed in different positions in a circumferential direction on an inspection surface of a wall surface of the duct. The inspection surface is orthogonal to an extending direction of the duct. A pressure chamber communicating with the measurement holes is provided on an outer peripheral side of the duct. The pressure chamber is coupled to a pressure gauge via a pressure pipe.

3 Claims, 3 Drawing Sheets

WALL SURFACE PRESSURE MEASUREMENT STRUCTURE AND WIND-TUNNEL TEST APPARATUS

CROSS-REFERENCE TO RELATED APPLICATIONS

The present application claims priority from Japanese Patent Application No. 2017-207779 filed on Oct. 27, 2017, the entire contents of which are hereby incorporated by reference.

BACKGROUND

1. Technical Field

The present invention relates to a technique that measures an average value of wall surface pressures in a duct.

2. Related Art

A wind-tunnel test for simulating the effect of airflow acting on an aircraft is performed to inspect airflow around a model mimicking the airframe thereof, an aerodynamic force acting on the model, and the like (see, for instance, Japanese Unexamined Patent Application Publication No. 10-267786).

When an external load acting on the model is calculated in such a wind-tunnel test, the aerodynamic load in an intake duct (air intake port) due to airflow needs to be removed from the load measurement value acting on the entire model. The load in the intake duct is calculated based on measurement values of the total pressure and a wall surface pressure in the vicinity of a duct outlet.

An average value on an inspection surface in the vicinity of the duct outlet is used as this wall surface pressure to take the distribution in a circumferential direction into consideration. Specifically, as illustrated in FIG. 5, a plurality of measurement holes provided in the inspection surface is individually coupled to a pressure gauge via pressure pipes, the pressures in the measurement holes are measured, and the average value thereof is calculated.

SUMMARY OF THE INVENTION

An aspect of the present invention provides a wall surface pressure measurement structure configured to measure a wall surface pressure in a duct. Measurement holes are formed in different positions in a circumferential direction on an inspection surface of a wall surface of the duct. The inspection surface is orthogonal to an extending direction of the duct. A pressure chamber communicating with the measurement holes is provided on an outer peripheral side of the duct. The pressure chamber is coupled to a pressure gauge via a pressure pipe.

Another aspect of the present invention provides a wind-tunnel test apparatus including a wind-tunnel; a blower configured to generate airflow in the wind-tunnel; and the wall surface pressure measurement structure in which the duct is an intake duct provided in a model of an aircraft, and the wall surface pressure in the intake duct of the model upon receipt of the airflow in the wind-tunnel is measured.

DETAILED DESCRIPTION

Figure 1:
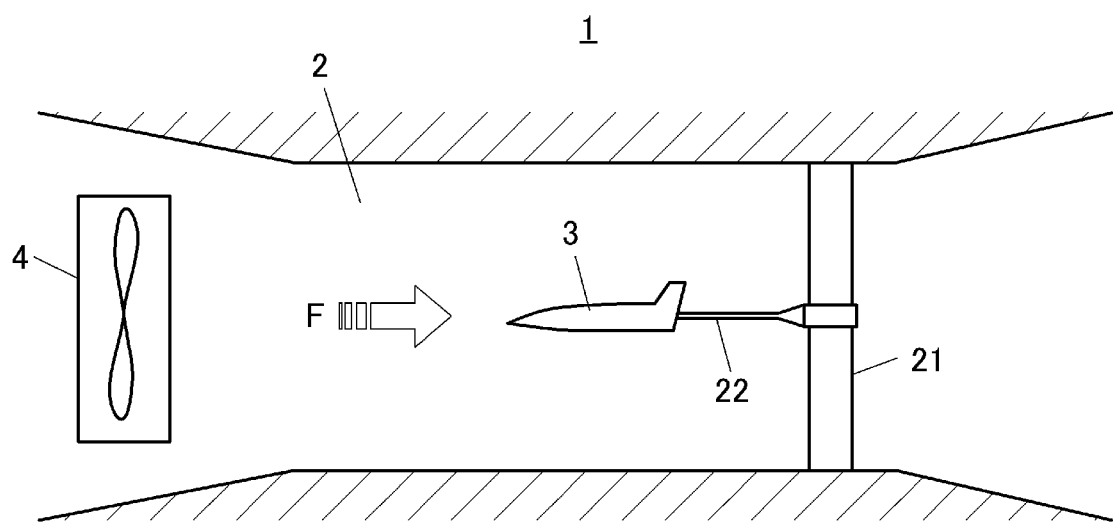
FIG. 1 illustrates a schematic structure of a wind-tunnel test apparatus according to an example.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

It is necessary to use as many measurement points (measurement holes) as possible to more accurately measure and calculate the average value of wall surface pressures.

However, if the number of measurement points is increased simply, the number of pressure pipes is also increased. Then, the measurement value is affected by the load acting on the pressure pipes, and the measurement precision is reduced. Therefore, in order to prevent an excess increase in interference loads due to the pressure pipes, there was no choice but to keep the number of measurement points small, such as three. Accordingly, the pressure distribution in a circumferential direction may not be measured precisely, and it is difficult to apply the wall surface pressure measurement structure of the related art to a structure in which flow in a duct is complicated.

It is desirable to accurately measure an average value of wall surface pressures even when flow in the duct is complicated.

Figure 2:
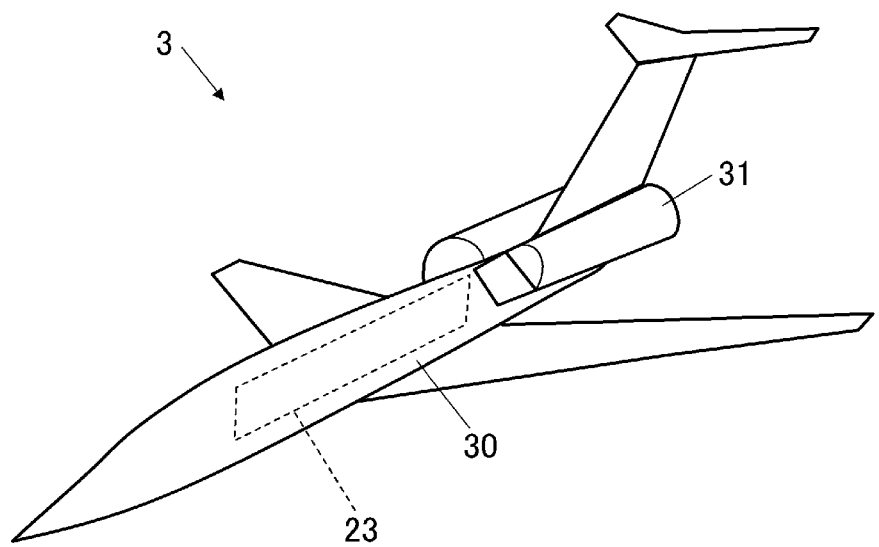
FIG. 2 is a perspective view illustrating a model according to the example.
Figure 3:
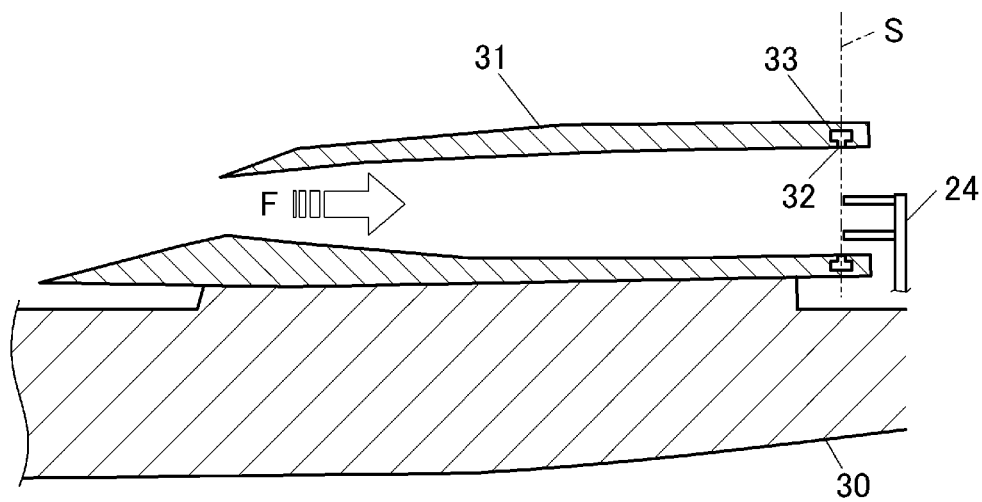
FIG. 3 is a longitudinal sectional view illustrating the model according to the example taken along an extending direction of an intake duct.
Figure 4:
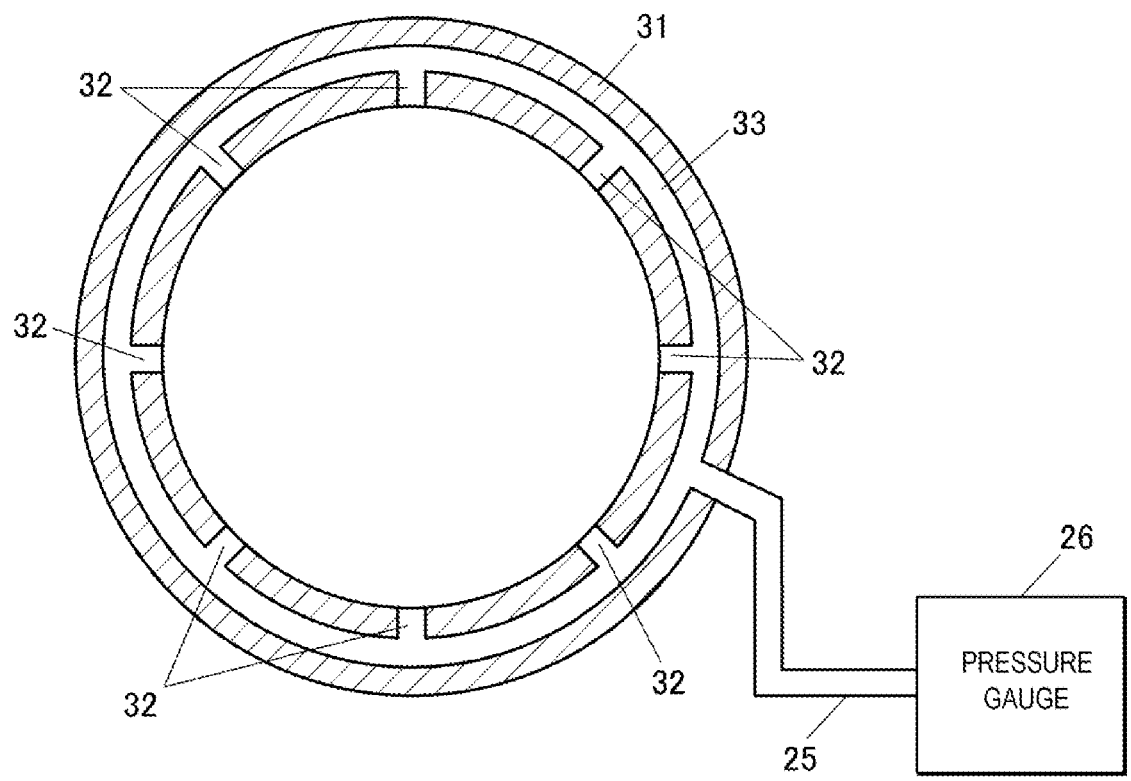
FIG. 4 is a cross sectional view illustrating the intake duct according to the example taken along an inspection surface.
Figure 5:
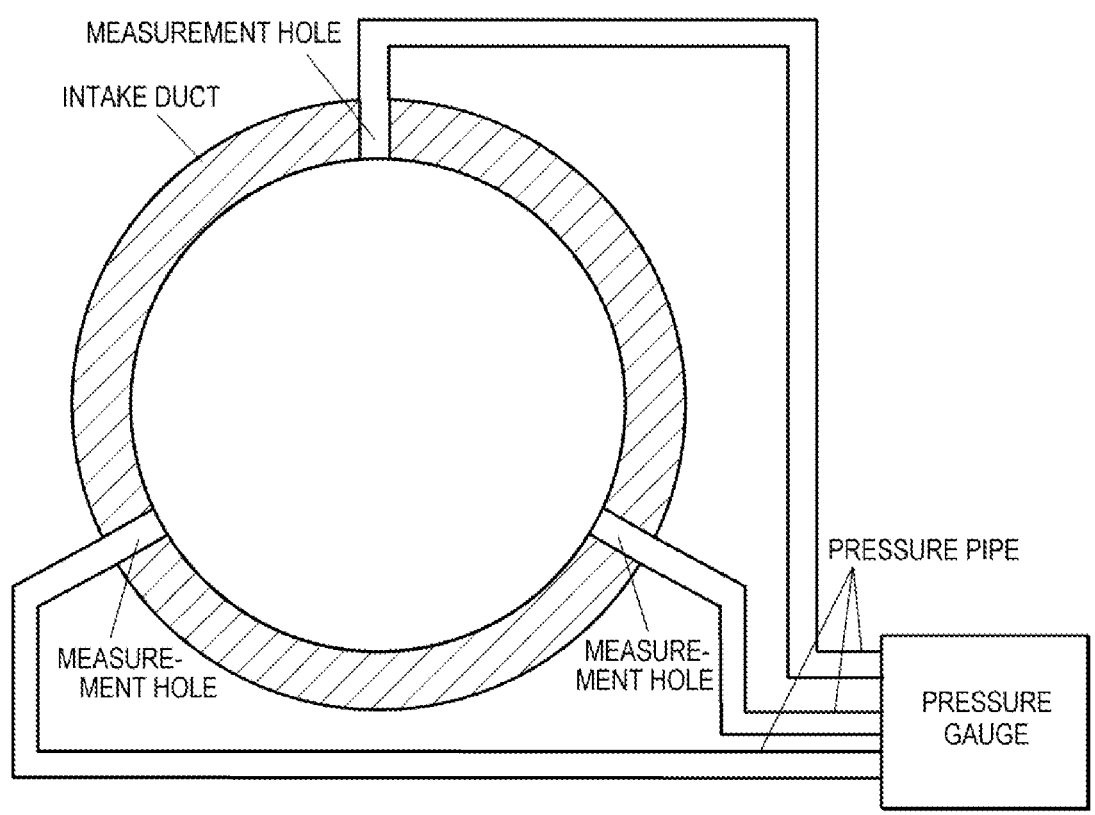
FIG. 5 illustrates a wall surface pressure measurement structure of related art.

FIG. 1 illustrates a schematic structure of a wind-tunnel test apparatus 1 according to the example. FIG. 2 is a perspective view illustrating a model 3 to be installed in the wind-tunnel test apparatus 1. FIG. 3 is a longitudinal sectional view illustrating the model 3 taken along an extending direction of an intake duct 31. FIG. 4 is a cross-sectional view illustrating an intake duct 31 taken along an inspection surface S which will be described later.

As illustrated in FIG. 1, the wind-tunnel test apparatus 1 according to the example measures an external load and the like acting on an aircraft. The wind-tunnel test apparatus 1 has, in a wind-tunnel 2, the model 3 mimicking an aircraft and a blower 4 that generates airflow F from the front side of the airframe of the model 3.

The model 3 is attached, via a balance 23, to a tip of a sting 22 projecting toward an upstream side in an air blowing direction from a support member 21 erected on a measurement part in the wind-tunnel 2.

The balance 23 is provided in a fuselage 30 of the model 3 as illustrated in FIG. 2. The balance 23 measures an aerodynamic force acting on the entire model 3.

The external load acting on the model 3 is calculated by subtracting the aerodynamic load acting on the inside of the intake duct 31 of the model 3 from the aerodynamic force acting on the entire model 3 measured by the balance 23. This is because the aerodynamic load acting on the inside of the intake duct 31 is assumed to be a part of a thrust force in an actual aircraft.

The aerodynamic load acting on the inside of the intake duct 31 is calculated based on the total pressure and the wall surface pressure (static pressure) in the vicinity of an outlet of the intake duct 31, as illustrated in FIG. 3. More specifically, the total pressure and the wall surface pressure on the inspection surface S orthogonal to the extending direction of the intake duct 31 are measured and the aerodynamic load is calculated based on these measurement values.

Of these pressures, the total pressure is measured by a pitot tube 24 configured to measure multiple points. This pitot tube 24 has tips inserted into the intake duct 31 from an open rear end so as to be located on the inspection surface S. The pitot tube 24 is fixed to the sting 22.

On the other hand, the wall surface pressure is measured as an average value of the static pressures in a plurality of (eight in the example) measurement holes 32 formed in the inspection surface S of the wall surface of the intake duct 31, as illustrated in FIG. 4.

Specifically, the plurality of measurement holes 32 is formed in different positions in the circumferential direction at equal intervals in the circumference on the inspection surface S. All of the plurality of measurement holes 32 communicates with an annular chamber 33 provided on an outer peripheral side thereof. This chamber 33 is coupled to a pressure gauge 26 via a single pressure pipe 25 so that the pressure can be measured.

This enables the pressure gauge 26 to measure the static pressures in the plurality of measurement holes 32 averaged in the chamber 33.

As described above, according to the example, the pressures are averaged in the chamber 33 that communicates with the plurality of measurement holes 32 and the averaged pressure is measured by the pressure gauge 26 via the pressure pipe 25.

Accordingly, the average value of the wall surface pressures can be measured with high precision by directly measuring the averaged wall surface pressure. In addition, unlike the related-art structure in which measurement holes are coupled to a pressure gauge via separate pressure pipes, the pressure is measured via only the single pressure pipe 25 regardless of the number of measurement points (the number of the measurement holes 32). Therefore, the number of measurement points can be increased without an increase in interference loads due to the pressure pipe 25.

Accordingly, the average value of the wall surface pressures can be accurately measured even when flow in the intake duct 31 is complicated.

It should be noted here that examples to which the present invention is applicable are not limited to the above described example and that the example can be modified appropriately without departing from the spirit of the invention.

For instance, the chamber 33 is provided in the intake duct 31 in the above example. However, the structure of the chamber 33 is not particularly limited to this example as long as the pressures in the plurality of measurement holes 32 can be averaged. For instance, the chamber 33 may be provided separately from the intake duct 31 or may have a non-annular shape.

In addition, in the above example, the wall surface pressures of the intake duct 31 in the model 3 of the aircraft are measured by applying the wall surface pressure measurement structure according to the example of the present invention to the wind-tunnel test apparatus 1. However, the wall surface pressure measurement structure according to the example of the present invention is not limited to this measurement instance, but is widely applicable to measurement of a wall surface pressure in a duct.

The invention claimed is:

1. A wall surface pressure measurement structure configured to measure a wall surface pressure in a duct,
    wherein measurement holes are formed in different positions in a circumferential direction on an inspection surface of a wall surface of the duct, the inspection surface being orthogonal to an extending direction of the duct,
    a pressure chamber communicating with the measurement holes is provided between the measurement holes and an outer peripheral side of the duct, and
    the pressure chamber is coupled to a pressure gauge via a pressure pipe.

2. The wall surface pressure measurement structure according to claim 1, wherein the duct is an intake duct provided in a model of an aircraft.

3. A wind-tunnel test apparatus comprising:
    a wind-tunnel;
    a blower configured to generate airflow in the wind-tunnel; and
    the wall surface pressure measurement structure according to claim 2,
    wherein the wall surface pressure in the intake duct of the model upon receipt of the airflow in the wind-tunnel is measured.

* * * * *